3,647,559
MEASURING DEVICE FOR CONTINUOUSLY MEASURING THE TEMPERATURE OF METAL BATHS

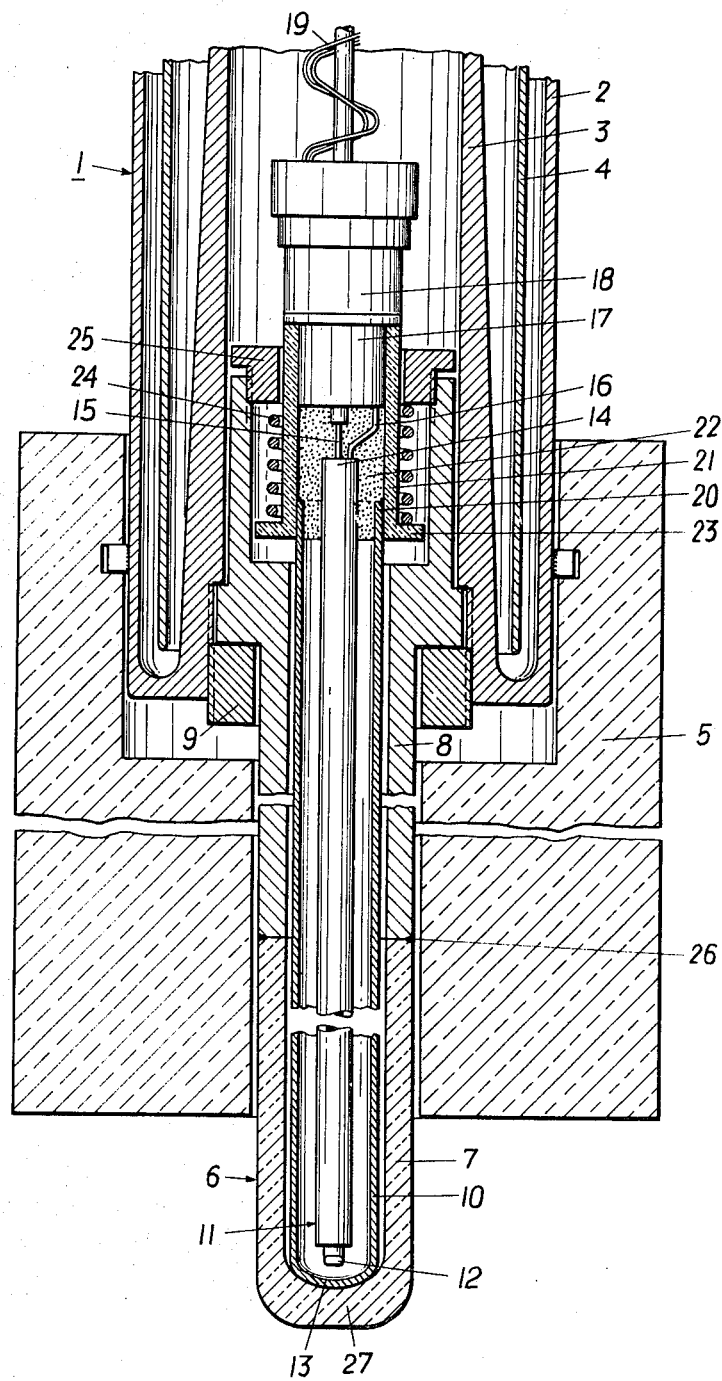

Meinhard Truppe, Matthias Schernthaner, and Günter Poferl, Linz, Austria, assignors to Vereinigte Osterreichische Eisen- und Stahlwerke Aktiengesellschaft, Linz, Austria
Filed Oct. 12, 1970, Ser. No. 79,825
Claims priority, application Austria, Oct. 16, 1969, 9,728
Int. Cl. G01k 1/12; H01v 1/02
U.S. Cl. 136—234                                7 Claims

ABSTRACT OF THE DISCLOSURE

The invention relates to a measuring device for continuously measuring the temperature of metal baths comprising a thermocouple with a hot junction, a capillary tube enclosing said thermocouple, and a sheath tube enclosing said capillary tube, said thermocouple having its leads connected to a socket of a coaxial plug providing for a connection to the compensating line of said thermocouple, said capillary tube and said socket being joined by a sleeve of electrically insulating material to form an integrally connected unit, wherein the improvement resides in that the device further comprises a gas-tight tube surrounding said capillary tube and extending with its upper end into said sleeve and being connected therewith so that the gas-tight tube is included into the integrally connected, exchangeable unit, the lower end of the gas-tight tube being closed and the hot junction of said thermocouple being arranged at a distance from the bottom of the gas-tight tube. By this invention an excellent heat transfer between the sheath tube and the gas-tight tube is obtained as well as an excellent temperature indication of the thermocouple although its tip does not immediately contact the bottom of the gas-tight tube. The danger that the thermocouple might break owing to shocks or the occurrence of thermal stresses and the penetration of humidity to the thermocouple leads is avoided.

---

Applicants' co-pending patent application Ser. No. 823,858 relates to a measuring device for continuously measuring the temperature of metal baths comprising a capillary tube inserted into a metallic or metal-ceramic sheath tube and housing a thermocouple, the leads of the thermocouple being connected to the socket of a coaxial plug, which coaxial plug provides for the connection with the compensating line of the thermocouple, said capillary tube and said socket being joined by a sleeve of electrically insulating material to form an integral unit.

The device described in the co-pending patent affords an essentially adequate measuring of the temperatures of metal melts and so far has been satisfactory in practice. The present invention is aimed at an improvement and further development of the device of the co-pending patent tending to prolong the life of the thermocouple and to widen the scope of its applicability, particularly with high temperatures.

The invention resides in that the upper end of a gas-tight tube surrounding the capillary tube extends into the sleeve and is connected therewith so that the gas-tight tube is included into the integral replaceable unit, the lower end of the gas-tight tube being closed and the hot junction being arranged at a distance from the bottom of the gas-tight tube.

Preferably the distance between the hot junction and the bottom of the gas-tight tube amounts to about 1 to 3 mm.

Preferably the gas-tight tube is connected by a gas-tight connecting means, such as a cast resin, gum or the like, with the sleeve, the socket and the capillary tube.

The sleeve and the connecting means may be made of the same plastics material.

Thus the production of the measuring device according to the invention is factlitated, since it is not necessary to produce the sleeve separately, and then connect it by the gas-tight connecting means with the capillary tube, the gas-tight tube and the socket. By casting into a casting mould, the outer shape of which corresponds to the form of the sleeve and into which the constructional parts to be connected with the sleeve are already inserted, it is possible in one process step to make the sleeve and at the same time connect it with the capillary tube, the gas-tight tube and the socket to form an integral unit.

According to a preferred embodiment, a pre-stressed spring is arranged between a ring which is releasably connected with the sheath tube and a flange of the sleeve so that the gas-tight tube which is integrally connected with the sleeve is pressed against the bottom of the sheath tube.

Practical service tests have shown that by including the gas-tight tube into the integral unit and by elastically pressing the tube against the bottom of the sheath tube an excellent heat transfer between the sheath tube and the gas-tight tube is obtained as well as an excellent temperature response of the thermocouple although its tip does not immediately contact the bottom of the gas-tight tube, as this was provided in the device according to the co-pending patent. Furthermore, in the device according to the invention, assembly is facilitated and the danger that the thermocouple might break owing to shocks or the occurrence of thermal stresses is reliably avoided. Further advantages gained when the gas-tight tube is included into the integral unit reside in that the penetration of humidity to the thermocouple leads is avoided. When the sheath tube surrounding the gas-tight tube is composed of two parts, the lower part being made of metal ceramic material and the upper part being made of steel, humidity may penetrate via the partition line between these two parts. By using gas-tight, electrically insulating material for connecting the individual parts of the constructional unit described above the advantage is gained that within the gas-tight tube a protective gas atmosphere may be created which is necessary in various special thermocouples for melts having temperatures of more than 1600° C.

In order that the invention may be more fully understood these and further features of the invention shall now be explained with reference to the accompanying drawing showing a vertical sectional view of the lower part of a temperature measuring lance with a built-in measuring device.

The water-cooled measuring lance 1 comprises an outer tube 2 and an inner tube 3. Between the outer tube and the inner tube a water guiding tube 4 is arranged. A jacket 5 made of refractory material is releasably fixed to the outer tube 2. When the sheath tube 6 which comprises a metal-ceramic part 7 and a steel part 8 is immersed into the melt, the jacket 5 serves to protect the sheath tube in the slag area. The sheath tube 6 is releasably connected by means of a screw nut 9 with the lower end of the inner tube 3. The gas-tight tube 10 surrounds the entire lower part of the thermocouple protected by the capillary tube 11. The hot junction 12 is arranged at a distance of 2 mm. from the bottom 13 of the gas-tight tube 10. At the upper end 14 of the capillary tube 11 the thermocouple leads 15, 16 are rigidly connected with the socket 17 of a coaxial plug. A plug 18 engages with the socket 17 and is connected with the compensation line 19. The upper end 20 of the gas-tight tube 10 is surrounded by a sleeve 21 made of electrically insulating material, and the hollow space between the socket 17 and the upper ends 14, 20 of the capillary tube and the gas-tight tube, respectively, is filled by a cast resin 22; the cast resin 22 rigidly connects the tubes 10, 11 with the sleeve 21 and the socket 17 and furthermore seals the thermocouple against the access of air and steam, which gases may enter e.g. through the juncture 26 between the sheath tube parts 7 and 8.

The sleeve 21 is provided with a flange 23. A spring 24, which is pre-stressed by means of a nut 25, presses the bottom 13 of the gas-tight tube 10 against the bottom 27 of the metal-ceramic sheath tube 7.

The measuring device according to the invention affords the continuous measurement of highest metal bath temperatures when special thermocouples are used. There is no deviation between the measured and the actual temperature; the thermocouple is not easily damaged so that its life is considerably prolonged.

What we claim is:

1. A measuring device for continuously measuring the temperature of metal baths comprising a thermocouple consisting of two leads joined at a hot junction, a capillary tube enclosing said thermocouple, and a sheath tube enclosing said capillary tube, said thermocouple leads being connected to a socket of a coaxial plug providing for a connection to a compensating line for said thermocouple, said capillary tube and said socket being joined by a sleeve of electrically insulating material to form an integral unit, and further comprising a gas-tight tube surrounding said capillary tube and within the sheath tube and extending with its upper end into said sleeve and being connected therewith so that the gas-tight tube is included into the integral exchangeable unit, the gas-tight tube having a closed bottom and the hot junction of said thermocouple being arranged at a distance from the bottom of the gas-tight tube.

2. The measuring device set forth in claim 1, wherein the sheath tube comprises two parts, the upper part being made of steel and the lower part being made of metal-ceramic material.

3. The measuring device set forth in claim 1, wherein the distance between the hot junction and the bottom of the gas-tight tube amounts to about 1 to 3 mm.

4. The measuring device set forth in claim 1, wherein the gas-tight tube is connected with the sleeve, the socket and the capillary tube by a connecting means selected from the group consisting of a cast resin and gum.

5. The measuring device set forth in claim 1, wherein the sleeve and the connecting means are made of the same material.

6. The measuring device set forth in claim 1, wherein a pre-stressed spring is inserted between a ring, which is releasably connected with the sheath tube, and a flange of the sleeve, so that the gas-tight tube which is integrally connected with the sleeve is pressed against the bottom of the sheath tube.

7. A device for continuously measuring the temperature of metal baths comprising a thermocouple composed of two leads joined at a hot junction, a capillary tube surrounding said thermocouple leads, a sheath tube closed at one end enclosing said capillary tube, a socket of a coaxial plug near the open end of said sheath tube receiving said leads for connection thereof to a compensating line, a sleeve of electrically insulating material joining said capillary tube and said socket to form an integral exchangeable unit, and further comprising a gas-tight tube enclosing said capillary tube and within the sheath tube and closed at one end to surround said hot junction projecting therein in spaced relationship, said gas-tight tube having its open end inserted into said sleeve and connected therewith so as to be incorporated within said integral exchangeable unit, and resilient means acting on said integral unit in a manner as to urge said closed gas-tight tube end into contact with said closed sheath tube end.

References Cited
UNITED STATES PATENTS

| | | | |
|---|---|---|---|
| 3,011,006 | 11/1961 | Nicholson et al. | 136—234 X |
| 3,277,716 | 10/1966 | Cox | 73—359 |
| 3,530,716 | 9/1970 | Truppe et al. | 73—343 R |

LOUIS R. PRINCE, Primary Examiner

F. SHOON, Assistant Examiner

U.S. Cl. X.R.

73—359